US010924618B2

(12) United States Patent
Namba et al.

(10) Patent No.: US 10,924,618 B2
(45) Date of Patent: Feb. 16, 2021

(54) IMAGE READING APPARATUS (71) Applicant: Brother Kogyo Kabushiki Kaisha, Nagoya (JP)

(72) Inventors: Mamoru Namba, Nagoya (JP); Katsuro Miura, Toyota (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/831,127

(22) Filed: Mar. 26, 2020

(65) Prior Publication Data
US 2020/0314271 A1 Oct. 1, 2020

(30) Foreign Application Priority Data
Mar. 28, 2019 (JP) ................................. 2019-062208

(51) Int. Cl.
H04N 1/04 (2006.01)
H04N 1/00 (2006.01)
(52) U.S. Cl.
CPC ..... H04N 1/00557 (2013.01); H04N 1/00551 (2013.01)
(58) Field of Classification Search
USPC ................................................ 358/474, 497
See application file for complete search history.

(56) References Cited

U.S. PATENT DOCUMENTS

| 8,833,930 B2* | 9/2014 | Karasawa .......... H04N 1/00519 347/108 |
| 8,988,696 B2* | 3/2015 | Katsuyama ........ H04N 1/00564 358/1.13 |
| 10,228,718 B2* | 3/2019 | Fukuda .............. G03G 15/5016 |
| 2002/0106933 A1* | 8/2002 | Lee ......................... H01R 13/72 439/501 |
| 2005/0168955 A1 | 8/2005 | Karasawa et al. |
| 2012/0075396 A1* | 3/2012 | Karasawa ............ H04N 1/0083 347/108 |
| 2020/0076974 A1* | 3/2020 | Koyanagi .......... H04N 1/00562 |

FOREIGN PATENT DOCUMENTS

| JP | 2005-119045 A | 5/2005 |
| JP | 2007-301822 A | 11/2007 |
| JP | 2018-148365 A | 9/2018 |

* cited by examiner

Primary Examiner — Cheukfan Lee
(74) Attorney, Agent, or Firm — Burr & Brown, PLLC (57) ABSTRACT An image reading apparatus includes: a main body extending in a widthwise direction and a depth direction; an image reader provided on an upper portion of the main body and extending in the widthwise direction and the depth direction; and an operation panel provided adjacent to one edge of the image reader which extends in the depth direction. The operation panel is provided at a front end portion of the main body. The operation panel is shorter than the image reader in the depth direction. A connector to which a connecting cable is connected is provided at a back surface of the operation panel located on an opposite side of the operation panel from the front end portion. At least a space is defined at the upper portion and extends in the depth direction from the back surface of the operation panel.

10 Claims, 8 Drawing Sheets

IMAGE READING APPARATUS

CROSS REFERENCE TO RELATED APPLICATION

The present application claims priority from Japanese Patent Application No. 2019-062208, which was filed on Mar. 28, 2019, the disclosure of which is herein incorporated by reference in its entirety.

BACKGROUND

The following disclosure relates to an image reading apparatus.

There is known a flatbed scanner as one example of a conventional image reading apparatus. This flatbed scanner includes a main body and an image reader. The main body extends in a widthwise direction and a depth direction orthogonal to the widthwise direction. The image reader is provided at an upper portion of the main body and extends in the widthwise direction and the depth direction.

The main body is provided with a connector. The connector is disposed at a back surface of the main body, i.e., a rear end of the main body in the depth direction.

In this flatbed scanner, the image reader reads an image formed on a document. A communication cable is connected to the connector. This flatbed scanner uses the communication cable to send an information processing device the image on the document which is obtained by the image reader and to receive reading settings from the information processing device.

SUMMARY

In the above-described conventional flatbed scanner, however, the connector is disposed at the back surface of the main body, making it difficult for a user to insert and remove the communication cable into and from the connector. Thus, the convenience of the flatbed scanner is low.

Accordingly, an aspect of the disclosure relates to an image reading apparatus with a higher convenience.

In one aspect of the disclosure, an image reading apparatus includes: a main body extending in a widthwise direction and a depth direction orthogonal to the widthwise direction; an image reader provided on an upper portion of the main body and extending in the widthwise direction and the depth direction; and an operation panel provided adjacent to one edge of the image reader which extends in the depth direction. The operation panel is provided at a front end portion of the main body. A length of the operation panel in the depth direction is less than that of the image reader in the depth direction. A connector to which a connecting cable is connected is provided at a back surface of the operation panel which is located on an opposite side of the operation panel from the front end portion of the main body. At least a space is defined at the upper portion of the main body so as to extend in the depth direction from the back surface of the operation panel.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described one embodiment by reference to the drawings.

Overall Configuration

Figure 1:
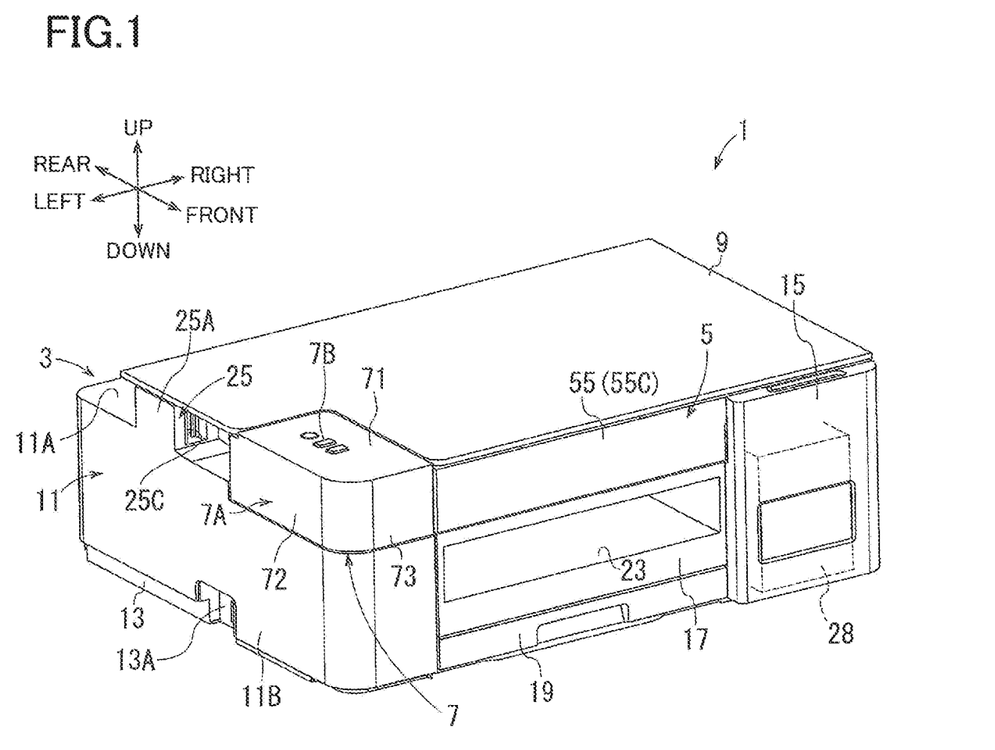
FIG. 1 is a perspective view of an image reading apparatus according to one embodiment.

As illustrated in FIG. 1, an image reading apparatus 1 according to one embodiment is one example of an image reading apparatus. The image reading apparatus 1 includes: a main body 3 including an image forming device 29; an image reader 5; an operation panel 7; and a cover 9.

In FIG. 1, a side on which an output opening 23 is formed is defined as a front side in the image reading apparatus 1. A left side when the image reading apparatus 1 is viewed by a user facing the output opening 23 is defined as a left side in the image reading apparatus 1. The right and left direction, the front and rear direction, and the up and down direction are defined with respect to these sides. The right and left direction, the front and rear direction, and the up and down direction are orthogonal to each other. The right and left direction is one example of a widthwise direction. The front and rear direction is one example of a depth direction. The up and down direction is one example of a height direction. The directions in FIGS. 2-8 correspond to the respective directions in FIG. 1. There will be described components of the image reading apparatus 1 with reference to FIGS. 1-8.

Configuration of Main Body

Figure 2:
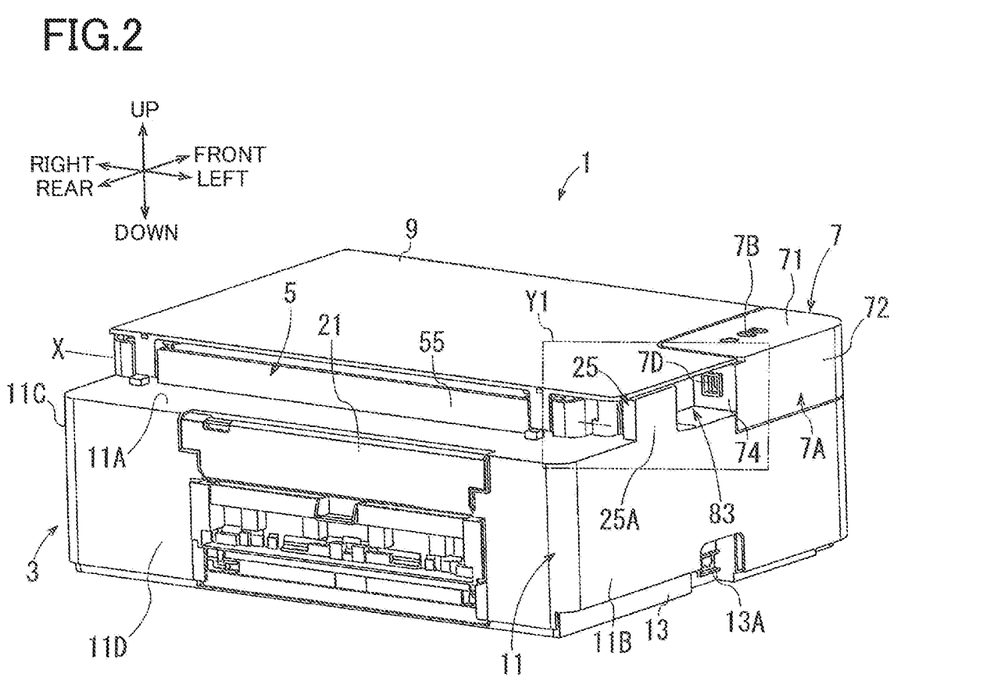
FIG. 2 is a perspective view of the image reading apparatus according to the embodiment.

As illustrated in FIGS. 1 and 2, the main body 3 includes a first main body 11 and a second main body 13. The first main body 11 includes an upper wall 11A, a left side wall 11B, a right side wall 11C, and a back wall 11D.

Figure 3:
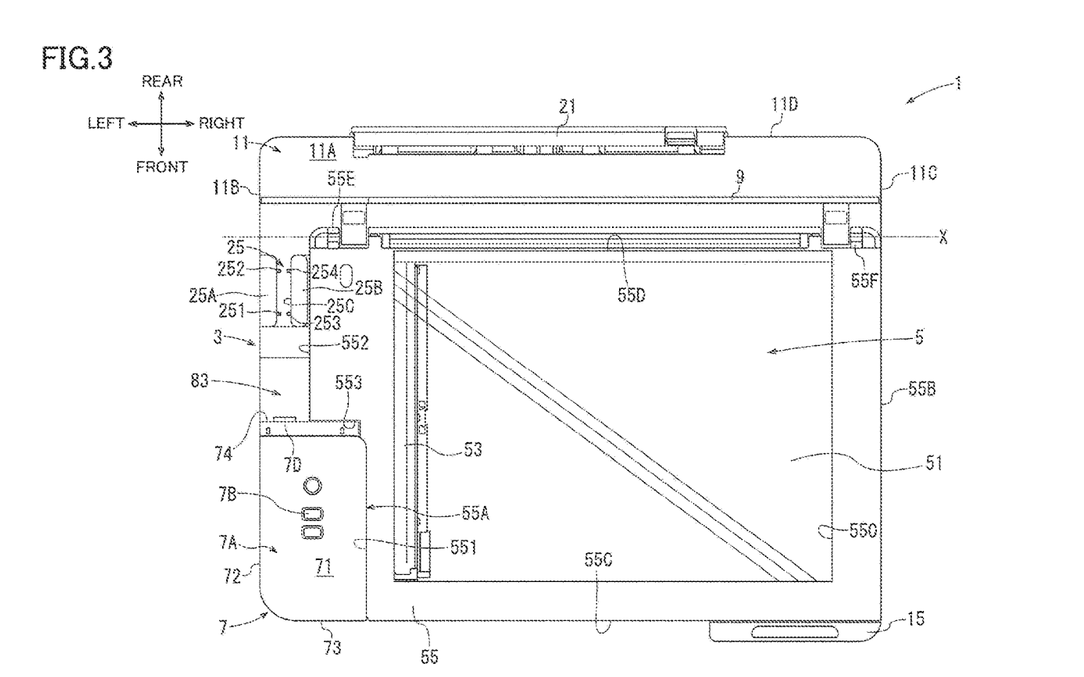
FIG. 3 is a top view of the image reading apparatus according to the embodiment.

The upper wall 11A is located at an upper portion of the first main body 11. As illustrated in FIG. 3, the upper wall 11A extends in the right and left direction and the front and rear direction. The left side wall 11B is located at a left end of the first main body 11. The left side wall 11B extends in the up and down direction and continues at its upper end to the upper wall 11A integrally. The left side wall 11B extends from a front end of the first main body 11 to a rear end of the first main body 11. Here, the left side wall 11B has a shape in which its front end portion curves in the right direction so as to extend in front of the first main body 11. As illustrated in FIG. 3, the left side wall 11B is located at the left end of the first main body 11. Though not illustrated in detail, the left side wall 11B extends in the up and down direction and the front and rear direction and continues at its upper end to the upper wall 11A integrally. As illustrated in FIG. 2, the back wall 11D is located at the rear end of the first main body 11. The back wall 11D extends in the up and down direction and continues at its upper end to the upper wall 11A integrally. The back wall 11D continues at its left end to a rear end of the left side wall 11B. The back wall 11D continues at its right end to a rear end of the right side wall 11C.

The second main body 13 extends in the right and left direction, the front and rear direction, and the height direction. The second main body 13 at its left end includes a connecting portion 13A. A power cable, not illustrated, is connected to the connecting portion 13A. It is noted that the position of the connecting portion 13A in the second main body 13 may be designed as needed. The connecting portion 13A may be provided on the first main body 11.

As illustrated in FIGS. 1 and 2, the main body 3 is formed by assembling the first main body 11 and the second main body 13 to each other in the up and down direction. Thus, the main body 3 has a substantially box shape extending in the right and left direction, the up and down direction, and the front and rear direction. The upper wall 11A of the first main body 11 is located at an upper portion of the main body 3, the left side wall 11B at a left end of the main body 3, and the right side wall 11C at a right end of the main body 3. The back wall 11D is located at a rear end of the main body 3, that is, the back wall 11D is located at a back surface of the main body 3. The second main body 13 is located at a lower portion of the main body 3. With this configuration, as illustrated in FIG. 2, the connecting portion 13A is located at a lower left portion of the main body 3.

As illustrated in FIG. 1, an ink cover 15, a front wall 17, and a sheet-supply tray 19 are provided on the main body 3. In addition, as illustrated in FIG. 2, a sheet-supply member 21 is provided on the main body 3.

As illustrated in FIG. 1, the ink cover 15 is disposed at a front right portion of the main body 3. Though not illustrated in detail, the ink cover 15 is attached to the main body 3 so as to allow the ink cover 15 to be drawn frontward. The front wall 17 is disposed in front of the main body 3 and to the left of the ink cover 15. The front wall 17 extends in the right and left direction and the up and down direction. The front wall 17 has the output opening 23. The output opening 23 communicates with the inside of the main body 3. The ink cover 15, the front wall 17, and a front end portion of the left side wall 11B constitute a front surface of the main body 3.

The sheet-supply tray 19 is disposed under the front wall 17. The sheet-supply tray 19 is capable of supporting thereon sheets, not illustrated, such as paper sheets. The sheet-supply tray 19 is installed in the main body 3 to store the sheets in the main body 3. The sheet-supply tray 19 is removable from the main body 3 by being pulled frontward with respect to the main body 3. As illustrated in FIG. 2, the sheet-supply member 21 is mounted on the back wall 11D and located at the back surface of the main body 3.

Figure 4:
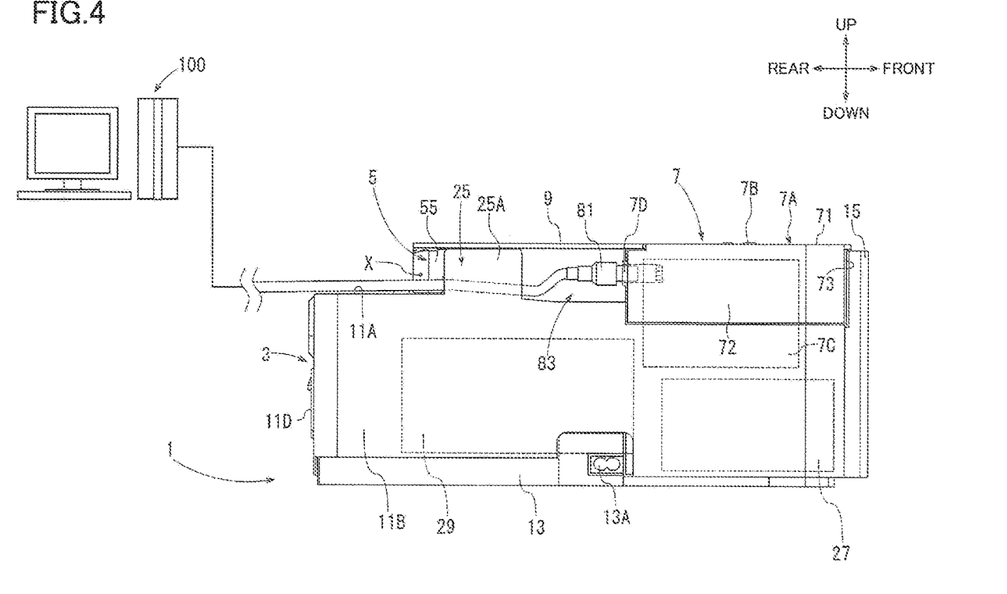
FIG. 4 is a side view of the image reading apparatus according to the embodiment, illustrating a state in which a connecting cable is connected to a connector.

Ink 28 stored in an ink cartridge is provided in the ink cover 15. A power device 27 and the image forming device 29 illustrated in FIG. 4 are provided in the main body 3. It is noted that FIGS. 1 and 4 schematically illustrate the ink 28, the power device 27, and the image forming device 29 for easy understanding.

As illustrated in FIG. 1, the ink 28 is provided on an inner side of the ink cover 15 and thereby located in a right portion of the inside of the main body 3. When the ink cover 15 is pulled frontward with respect to the main body 3, the ink 28 is replaceable by the ink cartridge being pulled from the inside of the ink cover 15, i.e., the inside of the main body 3. As illustrated in FIG. 4, the power device 27 is provided in a lower left portion of the inside of the main body 3. When the power device 27 is connected to the power cable via the connecting portion 13A for energization, the power device 27 supplies electric power to the image forming device 29, the image reader 5, the operation panel 7, and so on.

The image forming device 29 is provided at a rear portion of the inside of the main body 3. The image forming device 29 includes a conveying mechanism and an image forming mechanism, not illustrated. The image forming device 29 performs ink-jet printing to form an image on the sheet supplied from the sheet-supply tray 19 by the sheet-supply member 21. It is noted that the image forming device 29 may perform laser printing to form an image on the sheet, for example. The ink 28, the power device 27, and the image forming device 29 may be arranged as needed in the main body 3.

Configuration of Cable Holder

Figure 5:
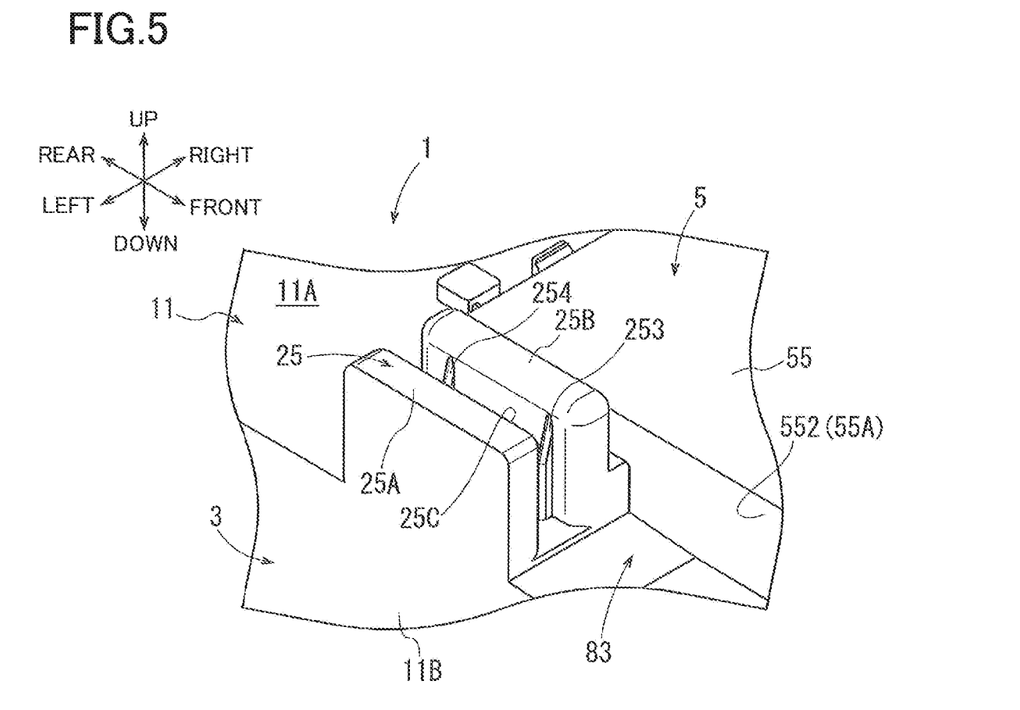
FIG. 5 is a fragmentary enlarged perspective view of the image reading apparatus according to the embodiment, illustrating a holder.

As illustrated in FIGS. 3 and 5, a cable holder 25 is provided on the main body 3. The cable holder 25 is one example of a holder. The cable holder 25 is provided on the upper wall 11A of the first main body 11, i.e., the upper portion of the main body 3.

The cable holder 25 includes a first standing wall 25A, a second standing wall 25B, and an insertion opening 25C. The first standing wall 25A and the second standing wall 25B are formed integrally with the upper wall 11A. The first standing wall 25A is located at a left end of the upper wall 11A and slightly at a rear of the center of the upper wall 11A in the front and rear direction. The first standing wall 25A has a substantially rectangular shape extending upward from the upper wall 11A while extending in the front and rear direction. The first standing wall 25A also continues to the left side wall 11B. The second standing wall 25B extends from the upper wall 11A and is located to the right of the first standing wall 25A. Like the first standing wall 25A, the second standing wall 25B is located slightly at a rear of the center of the upper wall 11A in the front and rear direction. The second standing wall 25B has a substantially rectangular shape extending upward from the upper wall 11A while extending in the front and rear direction. The second standing wall 25B is opposed to and spaced apart from the first standing wall 25A. It is noted that the shape of each of the first and second standing walls 25A, 25B such as the length of each of the first and second standing walls 25A, 25B may be designed as needed.

Figure 8:
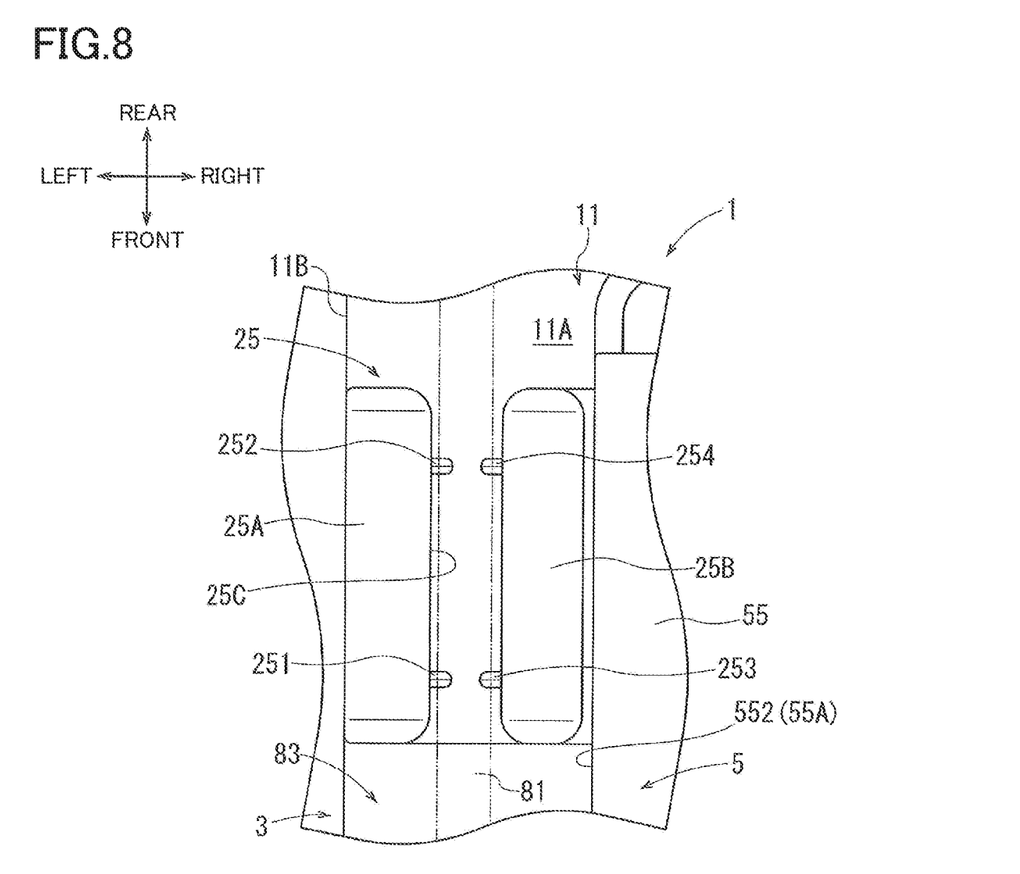
FIG. 8 is a fragmentary top view of the image reading apparatus according to the embodiment, illustrating area Y2 in FIG. 7.

As illustrated in FIG. 8, the first standing wall 25A is formed with first engaging ribs 251, 252 protruding toward the second standing wall 25B. Likewise, the second standing wall 25B is formed with second engaging ribs 253, 254 protruding toward the first standing wall 25A.

The insertion opening 25C is located between the first standing wall 25A and the second standing wall 25B. The insertion opening 25C opens upward and opens in the front and rear direction. A connecting cable 81 is insertable from above into the insertion opening 25C located between the first standing wall 25A and the second standing wall 25B.

Figure 7:
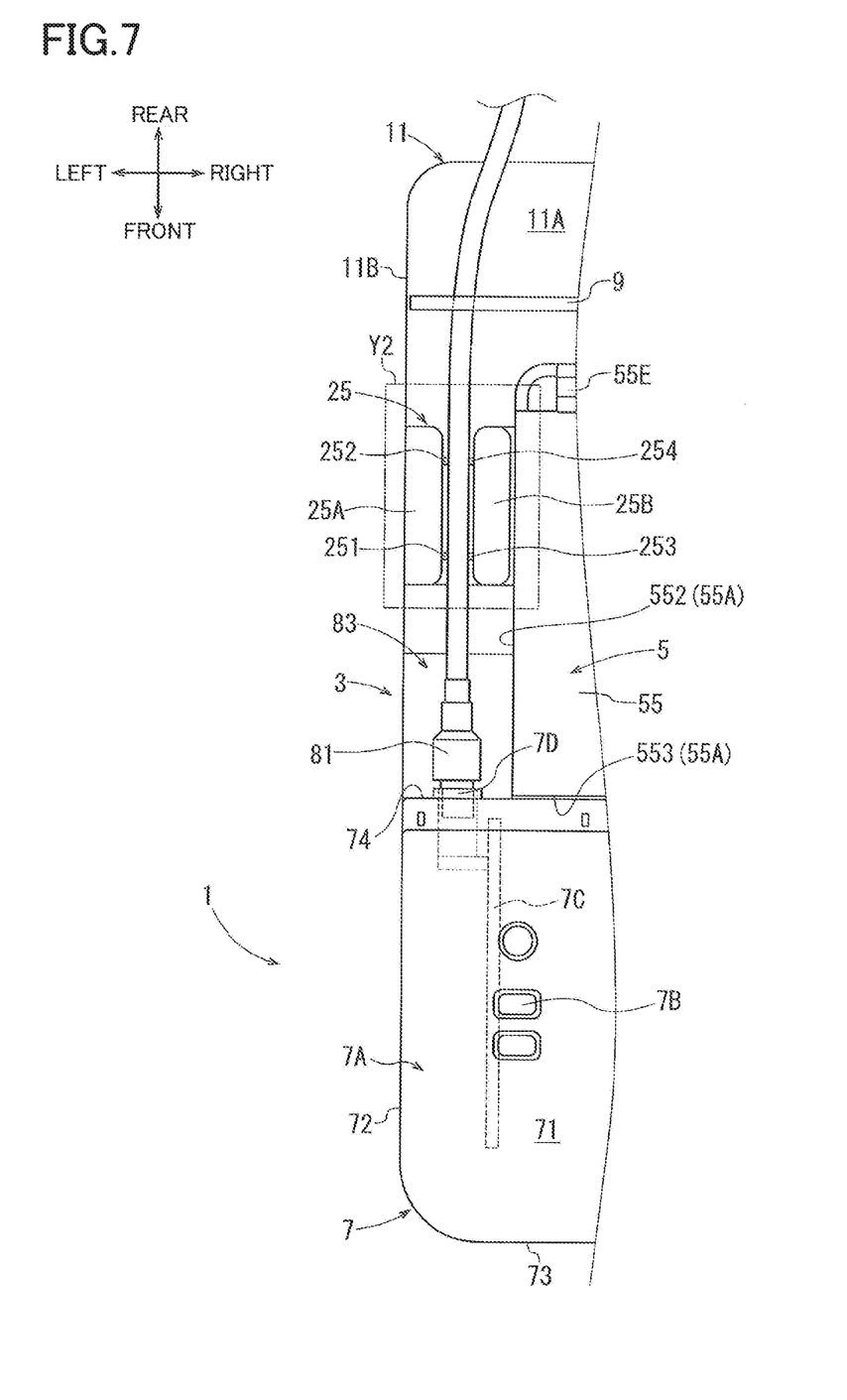
FIG. 7 is a fragmentary enlarged top view of the image reading apparatus according to the embodiment, illustrating the state in which the connecting cable is connected to the connector.

As illustrated in FIGS. 7 and 8, when the connecting cable 81 is inserted in the insertion opening 25C located between the first standing wall 25A and the second standing wall 25B, the cable holder 25 nips the connecting cable 81 using the first standing wall 25A and the second standing wall 25B to hold a portion of the connecting cable 81 which extends rearward from a back surface 74 of a casing 7A which will be described below. In this state, as illustrated in FIG. 8, the first engaging ribs 251, 252 and the second engaging ribs 253, 254 are in contact with the connecting cable 81 between the first standing wall 25A and the second standing wall 25B. It is noted that the connecting cable 81 and holding of the connecting cable 81 by the cable holder 25 will be described later in detail. FIG. 8 illustrates the connecting cable 81 in one-dot chain lines for easy understanding.

Configuration of Image Reader

As illustrated in FIG. 3, the image reader 5 is provided on the upper portion of the main body 3 so as to extend in the right and left direction and the front and rear direction. The image reader 5 includes a platen glass 51, a reading sensor 53, and a hold member 55.

The platen glass 51 has a rectangular shape extending in the right and left direction and the front and rear direction. A medium for reading of an image thereon is placeable on a front surface of the platen glass 51. Examples of the medium include a document and a book.

The reading sensor 53 is disposed under the platen glass 51, that is, the reading sensor 53 is disposed nearer to a back surface of the platen glass 51 than to its front surface. The reading sensor 53 is a well-known image reading sensor such as a contact image sensor (CIS) and a charge coupled device (CCD). The reading sensor 53 is movable with respect to the platen glass 51 in the right and left direction by a drive device, not illustrated. This configuration enables the reading sensor 53 to read an image on the medium placed on the platen glass 51.

The hold member 55 is secured to the upper wall 11A of the first main body 11 and disposed on the upper portion of the main body 3 to the right of the cable holder 25. The hold member 55 has a substantially rectangular shape includes a left edge (side) 55A, a right edge (side) 55B, a front edge (side) 55C, and a rear edge (side) 55D. The left edge 55A includes: a front portion 551 located at a left portion of the hold member 55 and extending in the front and rear direction; a rear portion 552 extending in the front and rear direction and located at a left end of the hold member 55 which is located to the left of the front portion 551; and the connecting portion 553 located between the front portion 551 and the rear portion 552 and extending in the right and left direction to connect between the front portion 551 and the rear portion 552. The right edge 55B is located at a right end of the hold member 55 so as to extend in the front and rear direction. The front edge 55C is located at a front end of the hold member 55 so as to extend in the right and left direction. The front edge 55C is connected at its left end to a front end of the left edge 55A, i.e., the front portion 551, and at its right end to a front end of the right edge 55B. The rear edge 55D is located at a rear end of the hold member 55 so as to extend in the right and left direction. The rear edge 55D is connected at its left end to a rear end of the left edge 55A, i.e., the rear portion 552, and at its right end to a rear end of the right edge 55B. The hold member 55 includes a first coupling portion 55E and a second coupling portion 55F. The first coupling portion 55E is located at a rear left portion of the hold member 55 and located at a rear of the rear edge 55D. The second coupling portion 55F is located at a rear right portion of the hold member 55 and located at a rear of the rear edge 55D. As illustrated in FIG. 3, the right side wall 11C of the main body 3 (as one example of a second side wall) and the right edge 55B of the hold member 55 (as one example of a fourth side wall) overlap each other when viewed in the up and down direction.

The hold member 55 covers the platen glass 51 from an upper side thereof and holds the platen glass 51. The hold member 55 has an opening 550. The hold member 55 exposes the platen glass 51 to the outside through the opening 550. Here, the length of the hold member 55 in the right and left direction is less than that of the upper wall 11A in the right and left direction, i.e., the length of the main body 3 in the right and left direction. The length of the hold member 55 in the front and rear direction is less than that of the main body 3 in the front and rear direction. Thus, each of the hold member 55 and the image reader 5 provided at the upper portion of the main body 3 extends in each of the right and left direction and the front and rear direction by a length less than that of the main body 3.

Configuration of Operation Panel

The operation panel 7 includes: the casing 7A illustrated in FIGS. 1-3; a plurality of operation switches 7B; a control board 7C illustrated in FIGS. 4 and 7; and a connector 7D. As illustrated in FIGS. 1-3, the casing 7A is shaped like a box opening downward and having a substantially rectangular shape in plan view. The casing 7A has an upper surface 71, a left surface 72, a front surface 73, the back surface 74, and a right surface, not illustrated. The length of the casing 7A in the front and rear direction is less than that of the hold member 55 in the front and rear direction, i.e., the length of the image reader 5 in the front and rear direction. That is, the operation panel 7 is formed so as to be less than each of the main body 3 and the image reader 5 in length in the front and rear direction. Each of the operation switches 7B is provided on the casing 7A at the upper surface 71 thereof. As illustrated in FIG. 3, the connector 7D of the operation panel 7 is disposed between the left side wall 11B (as one example of a first side wall) of the main body 3 and a left edge (side) of the image reader 5 (as one example of a third side wall) in the right and left direction (as one example of the widthwise direction). As illustrated in FIG. 3, the operation panel 7 is disposed nearer to the left side wall 11B (as one example of the first side wall) than to the right side wall 11C (as one example of the second side wall) in the right and left direction (as one example of the widthwise direction). The left surface 72 (as one example of a fifth side wall) of the operation panel 7 overlaps the left side wall 11B of the main body 3 when viewed in the up and down direction.

Figure 6:
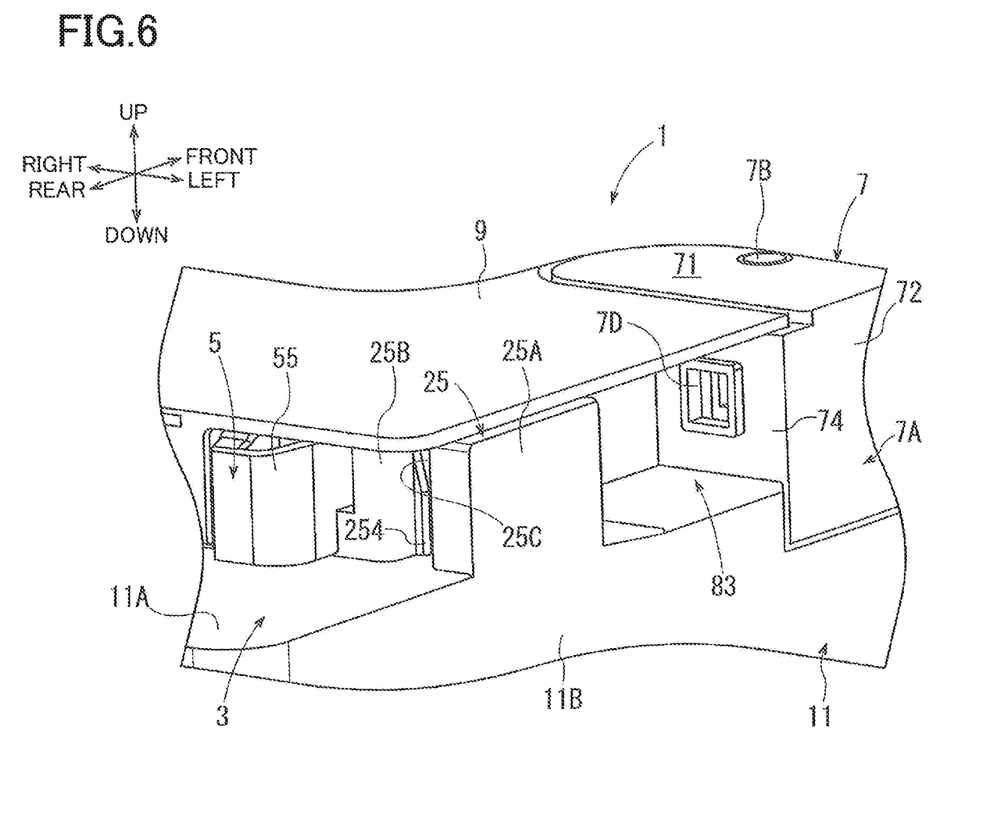
FIG. 6 is a fragmentary enlarged perspective view of the image reading apparatus according to the embodiment, illustrating area Y1 in FIG. 2.

As illustrated in FIGS. 4 and 7, the control board 7C is provided in the casing 7A and connected to each of the operation switches 7B. As illustrated in FIG. 6, the connector 7D is provided at the back surface 74 of the casing 7A. As illustrated in FIGS. 4 and 7, the connector 7D is connected to the control board 7C in the casing 7A. The connector 7D is connectable to the connecting cable 81. Examples of the connecting cable 81 include a USB (Universal Serial Bus) cable. As illustrated in FIG. 4, the image reading apparatus 1 is connectable to an information processing device 100 by the connecting cable 81 connected to the connector 7D. Examples of the information processing device 100 include an external personal computer (PC). It is noted that the shape of the connector 7D may be designed as needed in accordance with the shape of the connecting cable 81 and the standard therefor.

As illustrated in FIGS. 1-2, the casing 7A of the operation panel 7 is secured to the upper wall 11A of the first main body 11 in front of the cable holder 25. The operation panel 7 is disposed on the upper portion of the main body 3 at a left end of a front end portion of the main body 3. The operation panel 7 is adjacent to the left edge 55A of the hold member 55, more specifically, to the front portion 551 of the left edge 55A. Thus, as illustrated in FIG. 3, the operation panel 7 is located on the upper portion of the main body 3 and to the left of the image reader 5.

Here, the length of the casing 7A in the front and rear direction is less than that of the image reader 5 in the front and rear direction. Thus, since the operation panel 7 is provided on the main body 3, as illustrated in FIGS. 3 and 7, the back surface 74 of the casing 7A is located on an opposite side of the casing 7A from the front surface of the main body 3 and located in front of the back wall 11D of the first main body 11, i.e., the back surface of the main body 3. Accordingly, the connector 7D provided on the back surface 74 of the casing 7A is also located on an opposite side of the casing 7A from the front surface of the main body 3 and located in front of the back surface of the main body 3, and the connector 7D faces toward the back surface of the main body 3 from the back surface 74.

Since the operation panel 7 is secured in front of the cable holder 25, the back surface 74 of the casing 7A and the connector 7D are located in front of the cable holder 25. Thus, a space 83 extending rearward from the back surface 74 of the casing 7A toward the cable holder 25 is formed on the upper portion of the main body 3 between the operation panel 7 and the cable holder 25. In other words, the cable holder 25 is disposed on the upper portion of the main body 3 at a position located at a rear of the connector 7D provided on the back surface 74 of the casing 7A, with the space 83 interposed between the cable holder 25 and the connector 7D. As illustrated in FIG. 3, the space 83 opens upward and leftward.

Configuration of Cover

As illustrated in FIGS. 1-4, the cover 9 is disposed on the upper portion of the main body 3. The cover 9 is pivotable about an open/close axis X with respect to the first coupling portion 55E and the second coupling portion 55F of the hold member 55 illustrated in FIG. 3. This configuration makes the cover 9 movable between a first position illustrated in FIGS. 1, 2, and 4 and a second position illustrated in FIG. 3. As illustrated in FIG. 1, the cover 9 located at the first position covers the platen glass 51, the hold member 55, and the cable holder 25 from an upper side thereof. As illustrated in FIG. 4, the cover 9 located at the first position covers the space 83 from an upper side thereof. Here, as illustrated in FIG. 6, when the cover 9 is moved to the first position and covers the cable holder 25 from an upper side thereof, the first standing wall 25A and the second standing wall 25B are in contact with the cover 9. As illustrated in FIG. 3, the cover 9 located at the second position exposes the platen glass 51, the hold member 55, the cable holder 25, and the space 83 to an upper side thereof.

Image Reading Operation

In the case where the user wants to cause the image reading apparatus 1 to read the medium, the user moves the cover 9 to the second position and places the medium on the platen glass 51. The user then operates the operation switches 7B to cause the reading sensor 53 to read an image on the medium placed on the platen glass 51. As a result, reading of the image on the medium is finished. The image on the medium read by the reading sensor 53 may be formed on the sheet by the image forming device 29 as will be described below and may be transmitted to the information processing device 100 via the connecting cable 81.

Image Forming Operation

In the case where the image forming device 29 forms an image on a sheet, the user installs the sheet-supply tray 19 into the main body 3 in a state in which the sheet is placed on the sheet-supply tray 19. The user then operates the operation switches 7B to actuate the sheet-supply tray 19 and the image forming device 29. As a result, the sheet placed on the sheet-supply tray 19 is supplied to the image forming device 29. During conveyance of the sheet by the conveying mechanism of the image forming device 29, the image on the medium read by the reading sensor 53 is formed on the sheet by the image forming mechanism of the image forming device 29. This image reading apparatus 1 allows the user to place a sheet onto the sheet-supply member 21. In this case, the image forming device 29 forms an image on the sheet supplied from the sheet-supply member 21. The sheet with the image thereon formed by the image forming device 29 is discharged from the output opening 23. As a result, the image forming operation is finished. It is noted that the image transmitted from the information processing device 100 via the connecting cable 81 may be formed on the sheet by the image forming device 29.

Effects

In the image reading apparatus 1, the operation panel 7 is disposed on the upper portion of the main body 3 at the left end of the front end portion of the main body 3 so as to be adjacent to the front portion 551 of the left edge 55A of the hold member 55. In the operation panel 7, the connector 7D is provided at the back surface 74 of the casing 7A. The space 83 extending rearward from the back surface 74 of the casing 7A is formed on the upper portion of the main body 3 between the operation panel 7 and the cable holder 25. This configuration enables the user to insert and remove the connecting cable 81 into and from the connector 7D via the space 83.

Here, the length of the casing 7A in the front and rear direction is less than that of the hold member 55 in the front and rear direction. With this configuration, in the state in which the operation panel 7 is provided on the main body 3, each of the back surface 74 of the casing 7A and the connector 7D is located in front of the back wall 11D of the first main body 11, i.e., the back surface of the main body 3. This configuration makes it easy for the user to insert and remove the connecting cable 81 into and from the connector 7D when compared with the case where the connector 7D is provided at the back surface of the main body 3.

Accordingly, the image reading apparatus 1 according to the embodiment is highly convenient.

In the image reading apparatus 1, the cable holder 25 is provided on the upper portion of the main body 3, and the cable holder 25 is disposed at a rear of the back surface 74 of the casing 7A of the operation panel 7 with the space 83 interposed between the cable holder 25 and the back surface 74. As illustrated in FIGS. 4, 7, and 8, the cable holder 25 holds the connecting cable 81 connected to the connector 7D such that the connecting cable 81 extends rearward from the back surface 74. Since the cable holder 25 holds the connecting cable 81 connected to the connector 7D, it is possible to prevent poor or faulty electrical connection between the connecting cable 81 and the connector 7D and prevent the connecting cable 81 from dropping off the connector 7D unintentionally. This makes it difficult to cause communication failure between the image reading apparatus 1 and the information processing device 100. Also, since the cable holder 25 holds the connecting cable 81 such that the connecting cable 81 extends rearward from the back surface 74, it is difficult for the connecting cable 81 connected to the connector 7D, to be bent in the space 83 in the right and left direction. Thus, it is difficult for stress to act on the connecting cable 81 connected to the connector 7D, resulting in reduced damage to the connecting cable 81.

The cable holder 25 includes the first standing wall 25A, the second standing wall 25B, and the insertion opening 25C. The first standing wall 25A and the second standing wall 25B extend upward from the upper portion of the main body 3 and extend in the front and rear direction. With this configuration, the first standing wall 25A and the second standing wall 25B hold the connecting cable 81 therebetween, enabling the cable holder 25 to hold the connecting cable 81 well. The insertion opening 25C opens upward and opens in the front and rear direction. This configuration makes it easier to dispose the connecting cable 81 between the first standing wall 25A and the second standing wall 25B through the insertion opening 25C to hold the connecting cable 81.

Here, as illustrated in FIG. 8, the first standing wall 25A is formed with the first engaging ribs 251, 252 protruding toward the second standing wall 25B, and the second standing wall 25B is formed with the second engaging ribs 253, 254 protruding toward the first standing wall 25A. Thus, to hold the connecting cable 81, the first engaging ribs 251, 252 and the second engaging ribs 253, 254 are in contact with the connecting cable 81 between the first standing wall 25A and the second standing wall 25B so as to slightly dig in the connecting cable 81. This configuration enables the cable holder 25 to hold the connecting cable 81 firmly.

The image reading apparatus 1 includes the cover 9 that is movable between the first position and the second position. When located at the first position, the cover 9 covers not only the platen glass 51 and the cable holder 25 but also the space 83 from an upper side thereof. Thus, moving the cover 9 to the first position enables the image reading apparatus 1 to protect the platen glass 51. Here, the space 83 opens not only upward but also leftward. Thus, as illustrated in FIG. 4, even in the state in which the cover 9 is located at the first position, the user can recognize the connector 7D through the space 83 by viewing the image reading apparatus 1 from a left side thereof. Accordingly, the user can easily find the connector 7D, making it easier for the user to insert and remove the connecting cable 81 into and from the connector 7D.

The cover 9 located at the second position exposes not only the platen glass 51 and the cable holder 25 but also the space 83 to an upper side of the image reading apparatus 1, i.e., the outside of the image reading apparatus 1. This configuration enables the user to move the cover 9 to the second position to place the medium onto the platen glass 51. Moving the cover 9 to the second position enables the user to easily insert and remove the connecting cable 81 into and from the connector 7D via the space 83 and enables the cable holder 25 to hold the connecting cable 81.

In the image reading apparatus 1, the cable holder 25, more specifically, the first standing wall 25A and the second standing wall 25B are in contact with the cover 9 located at the first position. This configuration enables the cable holder 25 to support the cover 9 located at the first position from a lower side thereof using the first standing wall 25A and the second standing wall 25B. This ensures stiffness of the cover 9 located at the first position.

While the embodiment has been described above, it is to be understood that the disclosure is not limited to the details of the illustrated embodiment, but may be embodied with various changes and modifications, which may occur to those skilled in the art, without departing from the spirit and scope of the disclosure.

For example, the operation panel 7 may be disposed at a right end of the front end portion of the main body 3 so as to be adjacent to the right edge 55B of the hold member 55, i.e., a right portion of the image reader 5.

The first standing wall 25A and the second standing wall 25B may be connected to each other at their respective lower portions.

The present disclosure may be applied to image reading apparatuses or multi-function peripherals (MFPs), for example.

What is claimed is:

1. An image reading apparatus, comprising:
   a main body extending in a widthwise direction and a depth direction orthogonal to the widthwise direction;
   an image reader provided on an upper portion of the main body and extending in the widthwise direction and the depth direction; and
   an operation panel provided adjacent to one edge of the image reader which extends in the depth direction,
   wherein the operation panel is provided at a front end portion of the main body,
   wherein a length of the operation panel in the depth direction is less than that of the image reader in the depth direction,
   wherein a connector to which a connecting cable is connected is provided at a back surface of the operation panel which is located on an opposite side of the operation panel from the front end portion of the main body, and
   wherein at least a space is defined at the upper portion of the main body so as to extend in the depth direction from the back surface of the operation panel.

2. The image reading apparatus according to claim 1, wherein the connector is disposed in the widthwise direction between (i) a side wall of the main body in the widthwise direction which is located nearer to one of opposite ends of the main body in the widthwise direction than the other, and (ii) a side wall of the image reader in the widthwise direction which is located nearer to the one of the opposite ends of the main body in the widthwise direction than the other.

3. The image reading apparatus according to claim 1,
   wherein the main body comprises a first side wall and a second side wall each extending in an up and down direction, as opposite-end side walls of the main body in the widthwise direction,
   wherein the image reader comprises a third side wall and a fourth side wall each extending in the up and down direction, as opposite-side side walls of the image reader in the widthwise direction, and
   wherein the connector is disposed between the first side wall and the third side wall in the widthwise direction.

4. The image reading apparatus according to claim 3, wherein the second side wall and the fourth side wall overlap each other when viewed in the up and down direction.

5. The image reading apparatus according to claim 3, wherein the operation panel is disposed at a position nearer to the first side wall than to the second side wall in the widthwise direction.

6. The image reading apparatus according to claim 3,
   wherein the operation panel comprises a fifth side wall and a sixth side wall each extending in the up and down direction, as opposite-end side walls of the operation panel in the widthwise direction, and
   wherein the fifth side wall and the first side wall overlap each other when viewed in the up and down direction.

7. The image reading apparatus according to claim 1, wherein a holder is disposed on the upper portion of the main body, with the space interposed between the holder and the back surface of the operation panel, and the holder is configured to hold the connecting cable such that the connecting cable extends from the back surface in the depth direction.

8. The image reading apparatus according to claim 7,
wherein the image reader comprises a platen glass having a transparent plate shape and comprising a first surface that supports a medium, and
wherein the image reading apparatus further comprises a cover movable between (i) a first position at which the cover is located above the platen glass to cover the platen glass and the holder from an upper side thereof, and (ii) a second position in which the cover exposes the platen glass and the holder to an outside.

9. The image reading apparatus according to claim 8, wherein the holder supports the cover while being in contact with the cover located at the first position.

10. The image reading apparatus according to claim 7, wherein the holder comprises:
a first standing wall extending in the widthwise direction and a height direction orthogonal to the depth direction;
a second standing wall extending in the height direction, the first standing wall and the second standing wall being configured to hold the connecting cable therebetween; and
an insertion opening located between the first standing wall and the second standing wall so as to open upward to allow the connecting cable to be inserted into a space between the first standing wall and the second standing wall from above the first standing wall and the second standing wall.

* * * * *